United States Patent
Chen et al.

(10) Patent No.: US 7,173,981 B1
(45) Date of Patent: Feb. 6, 2007

(54) DUAL LAYER SIGNAL PROCESSING IN A LAYERED MODULATION DIGITAL SIGNAL SYSTEM

(75) Inventors: Ernest C. Chen, San Pedro, CA (US); Tiffany S. Furuya, Los Angeles, CA (US); Philip R. Hilmes, Santa Monica, CA (US); Joseph Santoru, Agoura Hills, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 701 days.

(21) Appl. No.: 10/068,047

(22) Filed: Feb. 5, 2002

Related U.S. Application Data (63) Continuation-in-part of application No. 09/844,401, filed on Apr. 27, 2001.

(51) Int. Cl.
  *H03D 3/00* (2006.01)
  *H03K 9/06* (2006.01)

(52) U.S. Cl. .............. 375/322; 375/316; 375/320; 375/261; 375/298; 375/308; 375/279; 375/281; 332/103; 329/304; 370/206; 455/17

(58) Field of Classification Search ............ 375/316, 375/320, 343, 261, 235, 298, 349, 308, 377, 375/279, 281; 342/252; 332/103; 329/304, 329/308; 370/206; 455/17
See application file for complete search history.

(56) References Cited

U.S. PATENT DOCUMENTS

| | | |
|---|---|---|
| 3,076,180 A | 1/1963 | Havens et al. |
| 3,383,598 A | 5/1968 | Sanders ............... 375/308 |
| 3,878,468 A | 4/1975 | Falconer et al. |
| 3,879,664 A | 4/1975 | Monsen |
| 3,974,449 A | 8/1976 | Falconer |
| 4,039,961 A * | 8/1977 | Ishio et al. ............ 329/308 |
| 4,068,186 A | 1/1978 | Sato et al. |
| 4,213,095 A | 7/1980 | Falconer |
| 4,253,184 A | 2/1981 | Gitlin et al. |

(Continued)

FOREIGN PATENT DOCUMENTS

DE 3642213 12/1986

(Continued)

OTHER PUBLICATIONS

Janssen G J M; Slimane S B: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

(Continued)

*Primary Examiner*—Temesghen Ghebretinsae
*Assistant Examiner*—Juan Alberto Torres
(74) *Attorney, Agent, or Firm*—Georgann S. Grunebach (57) ABSTRACT

Systems and methods for receiving layered modulation for digital signals are presented. An exemplary apparatus comprises a tuner for receiving a layered signal and producing a layered in-phase signal and a layered quadrature signal therefrom, an analog-to-digital converter for digitizing the layered in-phase signal and the layered quadrature signal and a processor for decoding the layered in-phase signal and the layered quadrature signal to produce one or more discrete layer signals.

36 Claims, 8 Drawing Sheets

U.S. PATENT DOCUMENTS

| | | | |
|---|---|---|---|
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,993,047 A | 2/1991 | Moffatt et al. | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,221,908 A | 6/1993 | Katz et al. | |
| 5,229,765 A | 7/1993 | Gardner | |
| 5,233,632 A | 8/1993 | Baum et al. | |
| 5,285,480 A | 2/1994 | Chennakeshu et al. | |
| 5,317,599 A | 5/1994 | Obata | |
| 5,329,311 A | 7/1994 | Ward et al. | 348/180 |
| 5,430,770 A | 7/1995 | Abbey | |
| 5,450,623 A | 9/1995 | Yokoyama et al. | 455/226.1 |
| 5,467,197 A | 11/1995 | Hoff | |
| 5,493,307 A | 2/1996 | Tsujimoto | |
| 5,555,257 A | 9/1996 | Dent | |
| 5,557,067 A | 9/1996 | Messelhi | |
| 5,577,067 A * | 11/1996 | Zimmerman | 375/224 |
| 5,577,087 A | 11/1996 | Furuya | 375/377 |
| 5,579,344 A | 11/1996 | Namekata | |
| 5,581,229 A | 12/1996 | Hunt | |
| 5,602,868 A | 2/1997 | Wilson | 375/219 |
| 5,603,084 A | 2/1997 | Henry et al. | |
| 5,606,286 A | 2/1997 | Bains | |
| 5,625,640 A | 4/1997 | Palmer et al. | |
| 5,642,358 A | 6/1997 | Dent | |
| 5,648,955 A | 7/1997 | Jensen et al. | |
| 5,732,113 A | 3/1998 | Schmidl et al. | |
| 5,793,818 A | 8/1998 | Claydon et al. | |
| 5,815,531 A | 9/1998 | Dent | 375/298 |
| 5,819,157 A * | 10/1998 | Ben-Efraim et al. | 725/68 |
| 5,828,710 A | 10/1998 | Beale | |
| 5,848,060 A | 12/1998 | Dent | |
| 5,870,443 A | 2/1999 | Rahnema | |
| 5,940,025 A | 8/1999 | Koehnke et al. | |
| 5,956,373 A | 9/1999 | Goldston et al. | |
| 5,960,040 A | 9/1999 | Cai et al. | 375/279 |
| 5,963,845 A | 10/1999 | Floury et al. | |
| 5,966,048 A | 10/1999 | Thompson | |
| 5,966,186 A | 10/1999 | Shigihara et al. | 348/570 |
| 5,966,412 A | 10/1999 | Ramaswamy | |
| 5,970,098 A | 10/1999 | Herzberg | |
| 5,987,068 A | 11/1999 | Cassia et al. | 375/281 |
| 5,995,832 A | 11/1999 | Mallinckrodt | |
| 5,999,793 A | 12/1999 | Ben-Efraim et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | 375/227 |
| 6,032,026 A | 2/2000 | Seki et al. | 455/63.1 |
| 6,034,952 A | 3/2000 | Dohi et al. | 370/335 |
| 6,052,586 A | 4/2000 | Karabinis | |
| 6,055,278 A | 4/2000 | Ho et al. | |
| 6,061,393 A | 5/2000 | Tsui et al. | |
| 6,084,919 A | 7/2000 | Kleider et al. | |
| 6,108,374 A | 8/2000 | Balachandran et al. | 375/227 |
| 6,125,148 A | 9/2000 | Frodigh et al. | |
| 6,128,357 A | 10/2000 | Lu et al. | |
| 6,131,013 A | 10/2000 | Bergstrom et al. | |
| 6,140,809 A | 10/2000 | Doi | 324/76.24 |
| 6,141,534 A | 10/2000 | Snell et al. | |
| 6,144,708 A | 11/2000 | Maruyama | |
| 6,166,601 A | 12/2000 | Shalom et al. | |
| 6,178,158 B1 | 1/2001 | Suzuki et al. | |
| 6,188,717 B1 | 2/2001 | Kaiser et al. | |
| 6,212,360 B1 | 4/2001 | Fleming et al. | |
| 6,219,095 B1 | 4/2001 | Zhang et al. | 348/192 |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | 455/17 |
| 6,297,691 B1 * | 10/2001 | Anderson et al. | 329/300 |
| 6,304,594 B1 | 10/2001 | Salinger | |
| 6,307,435 B1 | 10/2001 | Nguyen et al. | |
| 6,320,919 B1 | 11/2001 | Khayrallah et al. | |
| 6,325,332 B1 | 12/2001 | Cellier et al. | |
| 6,330,336 B1 | 12/2001 | Kasama | |
| 6,333,924 B1 | 12/2001 | Porcelli et al. | |
| 6,366,309 B1 | 4/2002 | Siegle | |
| 6,369,648 B1 | 4/2002 | Kirkman | |
| 6,389,002 B1 | 5/2002 | Schilling | |
| 6,411,659 B1 | 6/2002 | Liu et al. | |
| 6,411,797 B1 | 6/2002 | Estinto | |
| 6,426,822 B1 | 7/2002 | Winter et al. | |
| 6,429,740 B1 | 8/2002 | Nguyen et al. | |
| 6,433,835 B1 | 8/2002 | Hartson et al. | |
| 6,477,398 B1 | 11/2002 | Mills | |
| 6,501,804 B1 | 12/2002 | Dietmar et al. | |
| 6,515,713 B1 | 2/2003 | Nam | |
| 6,535,497 B1 | 3/2003 | Raith | |
| 6,535,801 B1 | 3/2003 | Geier et al. | |
| 6,574,235 B1 * | 6/2003 | Arslan et al. | 370/464 |
| 6,597,750 B1 | 7/2003 | Knutson et al. | |
| 6,718,184 B1 | 4/2004 | Aiken et al. | |
| 6,731,700 B1 | 5/2004 | Yakhnich et al. | |
| 6,741,662 B1 | 5/2004 | Francos et al. | |
| 6,745,050 B1 | 6/2004 | Forsythe et al. | |
| 6,775,521 B1 | 8/2004 | Chen | |
| 6,892,068 B2 | 5/2005 | Karabinis et al. | |
| 6,934,314 B2 | 8/2005 | Harles et al. | |
| 6,970,496 B1 | 11/2005 | Ben-Bassat et al. | |
| 2001/0012322 A1 | 8/2001 | Nagaoka et al. | |
| 2001/0024479 A1 | 9/2001 | Samarasooriya | |
| 2002/0006795 A1 | 1/2002 | Norin et al. | |
| 2002/0071506 A1 | 6/2002 | Lindquist et al. | |
| 2002/0158619 A1 | 10/2002 | Chen | |
| 2002/0176516 A1 | 11/2002 | Jeske et al. | |
| 2003/0002471 A1 | 1/2003 | Crawford et al. | |
| 2003/0138037 A1 | 7/2003 | Kaku et al. | |
| 2004/0110467 A1 | 6/2004 | Wang | |
| 2004/0146296 A1 | 7/2004 | Gerszberg et al. | |
| 2005/0008100 A1 | 1/2005 | Chen | |
| 2006/0056541 A1 | 3/2006 | Chen et al. | |

FOREIGN PATENT DOCUMENTS

| | | | |
|---|---|---|---|
| EP | 0222076 | 8/1986 | |
| EP | 0 238 822 A2 | 9/1987 | 332/9 R |
| EP | 0 356 096 A2 | 2/1990 | |
| EP | 0929164 | 7/1999 | |
| FR | 2696295 | 4/1994 | |
| JP | 2-5631 | 1/1990 | |
| JP | 2-95033 | 4/1990 | |
| JP | 03139027 | 6/1991 | |

| | | |
|---|---|---|
| JP | 5-41683 | 2/1993 |
| JP | 5-114878 | 5/1993 |
| JP | 5-252084 | 9/1993 |
| JP | 07-038615 | 2/1995 |
| WO | WO 99/20001 | 4/1999 |
| WO | WO 02/073817 | 9/2002 |
| WO | WO 2005/074171 | 8/2005 |
| WO | WO 2005/086444 | 9/2005 |

OTHER PUBLICATIONS

Slimane S B; Janssen G J M: "Power Optimization of M-PSK Cochannel Signals for a Narrowband Multiuser Detector", 2001 IEEE Pacific Rim Conference on Communications, Computer and Signal Processing, Victoria BC, Canada, Aug. 26-28, 2001, XP010560334.

Soong , A C K; Krzymien W A: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP01059490.

Arslan H; Molnar K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, USA, XP010538900.

Gianluca Mazzini, *Power Division Multiple Access*, IEEE, 1998, pp. 543-546.

A.A.M. Saleh et al., *Adaptive Linearization of Power Amplifiers in Digital Radio Systems*, Bell System Technical Journal, 1983, vol. 62, pp. 1019-1033.

Ramchandran, Kannan et al., *Multiresolution Broadcast for Digital HDTV Using Joint Source/Channel Coding*, IEEE, vol. 11, No. 1, Jan. 1993, pp. 6-22.

Meyr, Heinrich et al.; "Digital Communication Receivers: Synchronization, Channel Estimation, and Signal Processing"; 1998; John Wiley & Sons, pp. 212-213, 217-218, XP002364874.

Meyr, Heinrich et al.; "Digital Communication Receivers: Synchronization, Channel Estimation, and Signal Processing"; 1998; John Wiley & Sons, pp. 610-612, XP002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Fang, T. et al.; "Fourth-Power Law Clock Recovery with Prefiltering", Proceedings of the International Conference on Communications (ICC), Geneva, May 23-26, 1993, New York, IEEE US, vol. 3, May 23, 1993, pp. 811-815, XP010137089, ISBN:0-7803-0950-2, Section I, Introduction.

\* cited by examiner

DUAL LAYER SIGNAL PROCESSING IN A LAYERED MODULATION DIGITAL SIGNAL SYSTEM

CROSS-REFERENCE TO RELATED APPLICATIONS

This is a continuation-in-part application and claims the benefit under 35 U.S.C. Section 120 of the following copending and commonly-assigned U.S. utility patent application, which is incorporated by reference herein:

Utility application Ser. No. 09/844,401, filed Apr. 27, 2001, by Ernest C. Chen, entitled "LAYERED MODULATION FOR DIGITAL SIGNALS,".

This application is related to the following co-pending and commonly-assigned U.S. patent applications, which is incorporated by reference herein:

Application Ser. No. 10/068,039, filed on the same date herewith, by Ernest C. Chen et al., entitled "PREPROCESSING SIGNAL LAYERS IN A LAYERED MODULATION DIGITAL SIGNAL SYSTEM TO USE LEGACY RECEIVERS,".

BACKGROUND OF THE INVENTION

1. Field of the Invention

The present invention relates generally to systems for receiving digital signals, and in particular, to systems for receiving layered modulation in digital signals.

2. Description of the Related Art

As various digital signal communication systems and services evolve, there is a burgeoning demand for increased data throughput and added services. However, it is more difficult to implement improvements in old systems and new services when it is necessary to replace existing legacy hardware, such as transmitters and receivers. New systems and services are advantaged when their appearance does not render legacy hardware obsolete. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8PSK) or sixteen quadrature amplitude modulation (16QAM). Unfortunately, QPSK receivers cannot demodulate 8PSK or 16QAM signals. As a result, legacy customers with QPSK receivers must upgrade their receivers in order to continue to receive any signals transmitted with an 8PSK or 16QAM modulation.

Layered modulation enables systems and methods of transmitting signals to accommodate enhanced and increased data throughput without requiring additional frequency bands. Systems using layered modulation can provide enhanced and increased throughput signals for new receivers while remaining compatible with legacy receivers. Newer layered modulation techniques (such as detailed in U.S. patent application Ser. No. 09/844,401, filed Apr. 27, 2001, and entitled "LAYERED MODULATION FOR DIGITAL SIGNALS") also provide the unique advantage of allowing transmission signals to be upgraded from a source separate from the legacy transmitter. In other words, the layered signals can be asynchronous and/or non-coherent.

Related receiver systems for layered signals have also been described, such as those found in U.S. Pat. No. 4,039,961, which is incorporated by reference herein. However, such receiver systems are based on analog circuits, synchronized by a voltage control oscillator. In addition, such receiver systems are limited because they are designed to only receive coherent layered signals, i.e. signals that are synchronously produced.

Furthermore, because additional signal processing usually introduces unwanted noise, it is also important to minimize the amount of processing performed on a received signal. A single processor which accommodates high speed decoding of the multiple layers introduces a minimum of additional noise. A processor that can demodulate and decode a layered signal into distinct signal layers, enables separate downstream transports (e.g. MPEG decoders) to directly receive less noisy signals.

There is a need for systems and methods for receiving and processing the layered modulation signals. There is also a need for systems and methods for decoding layered signals digitally. There is further a need for a single integrated processor for decoding distinct signals of a layered signal. The present invention meets these needs.

SUMMARY OF THE INVENTION

The present invention provides a flexible and expandable apparatus that can be implemented with high speed logic circuit capable of performing demodulator functions and processing of received layered modulation signals in real-time. The invention utilizes high speed digitization of the incoming signal to prepare it for further high speed digital processing. The digital processing demodulates and decodes the distinct layers of layered signal. The invention enables a receive system architecture wherein the incoming layered signal is processed by a single decoder to produce distinct layer signals for further decoding, thereby minimizing signal noise and cost. The processor can be included in a single integrated receiver/decoder (IRD) further comprising a separate transport for each decoded signal layer.

An exemplary apparatus comprises a tuner for receiving a layered signal and producing a layered in-phase signal and a layered quadrature signal therefrom, an analog-to-digital converter for digitizing the layered in-phase signal and the layered quadrature signal and a processor for decoding the layered in-phase signal and the layered quadrature signal to produce one or more discrete layer signals.

In one embodiment, the invention comprises one or more transports, such as for MPEG decoders, each receiving and decoding one of the one or more discrete layer signals to be displayed.

The high speed digital processor performs many functions in decoding the signal layers. The processor demodulates and decodes the upper layer from the layered in-phase signal and the layered quadrature signal to produce the upper layer signal for a video transport. The processor also produces an ideal upper layer signal including an ideal in-phase upper layer signal and an ideal quadrature upper layer signal from the decoded upper layer signal and subtracts these from the layered in-phase signal and the layered quadrature signal, respectively, to produce the lower layer in-phase signal and the lower layer quadrature signal of the lower signal layer. The layered in-phase signal and the layered quadrature signal can be delayed to synchronize the subtraction. Delaying the layered in-phase signal and the layered quadrature signal can be done by correlating the demodulated upper layer signal to the ideal upper layer signal to determine the proper delay.

After the lower layer signal is produced by the subtraction, the processor further demodulates and decodes the lower layer in-phase signal and the lower layer quadrature signal to produce the lower layer signal for a video transport. In doing so, the processor can match filter the lower layer in-phase signal and the lower layer quadrature signal.

In other embodiments, generating the ideal upper layer signals can comprise advanced signal processing. For example, processor can apply a signal map to the ideal in-phase upper layer signal and the ideal quadrature upper layer signal, the signal map accounting for transmission distortions of the layered signal. The signal processing can also comprise pulse shaping the ideal in-phase upper layer signal and the ideal quadrature upper layer signal. Signal processing can also comprise amplitude and phase matching the ideal in-phase upper layer signal and the ideal quadrature upper layer signal with the layered in-phase signal and the layered quadrature signal, respectively.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

1. Overview

The present invention provides for the reception of non-coherent layered modulation signals using legacy and multi-layer receivers. The signal layers can be independently modulated and coded. The layered signal is passed through a high speed digitizer to prepare it for digital processing. Processing the digitized layered signal yields the distinct layer signals which can then be presented to separate transports for conversion to a video signal.

2. Layered Signals

Figure 1A:
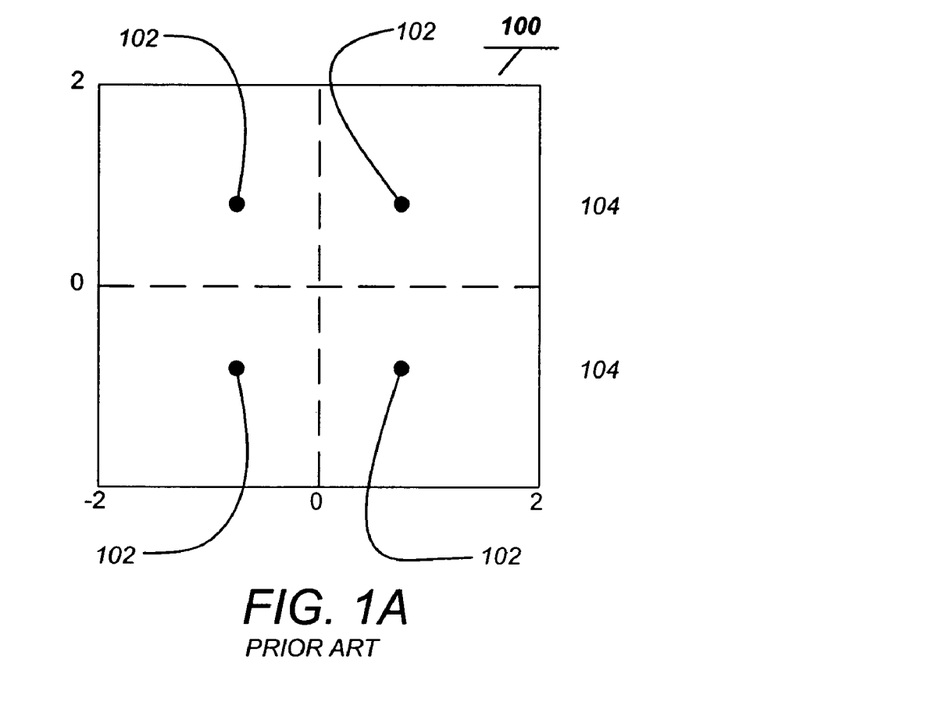
FIGS. 1A–1C illustrate the relationship of signal layers in a layered modulation transmission.
Figure 1B:
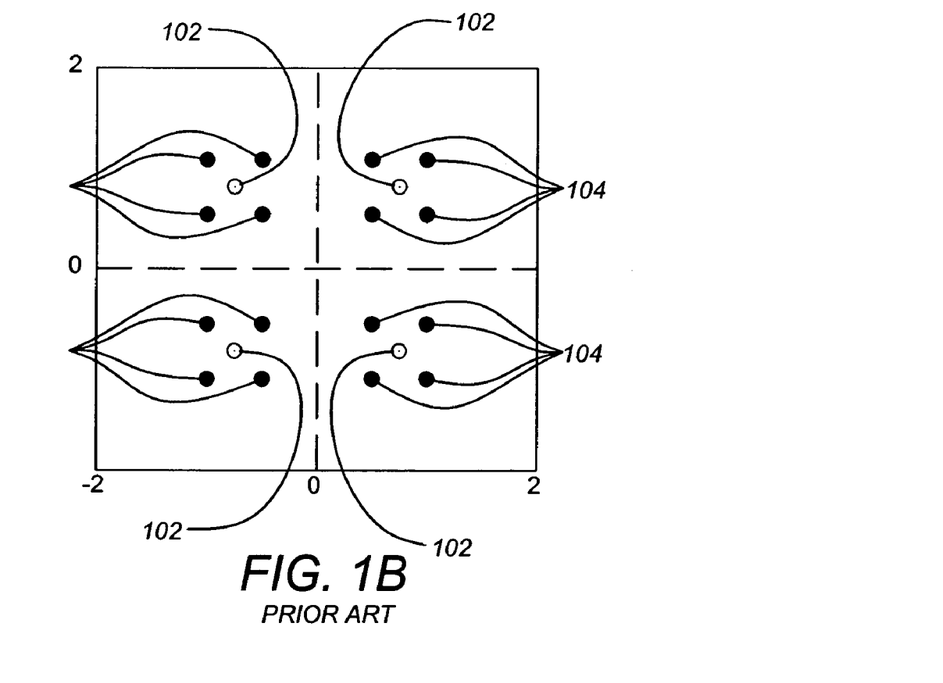
Figure 1C:
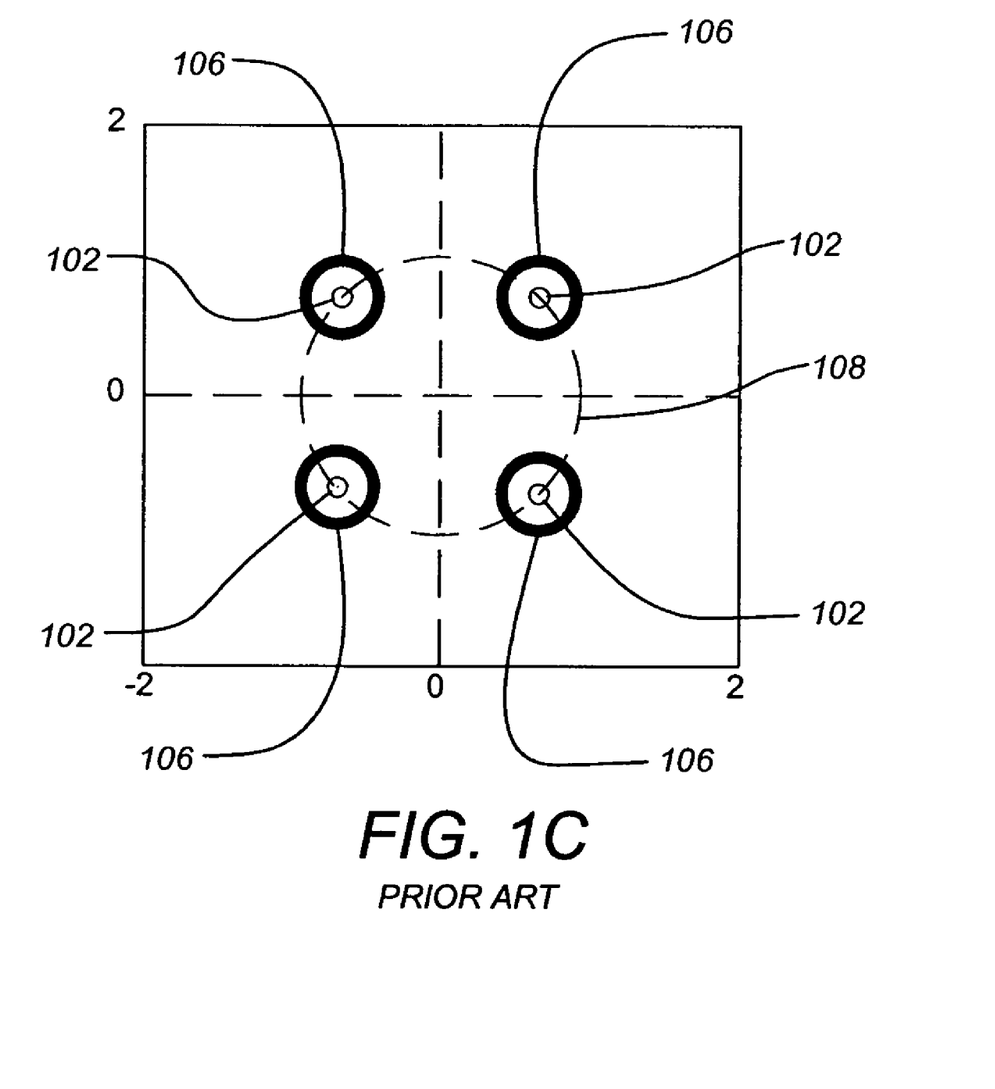

FIGS. 1A–1C illustrate the basic relationship of signal layers in a layered modulation transmission. FIG. 1A illustrates a upper layer signal constellation 100 of a transmission signal showing the signal points or symbols 102. FIG. 1B illustrates the lower layer signal constellation of symbols 104 over the upper layer signal constellation 100 where the layers are coherent. FIG. 1C illustrates a lower signal layer 106 of a second transmission layer over the upper layer constellation where the layers may be non-coherent. The lower layer 106 rotates about the upper layer constellation 102 due to the relative modulating frequencies of the two layers in a non-coherent transmission. Both the upper and lower layers rotate about the origin due to the upper layer modulation frequency as described by path 108.

Figure 2A:
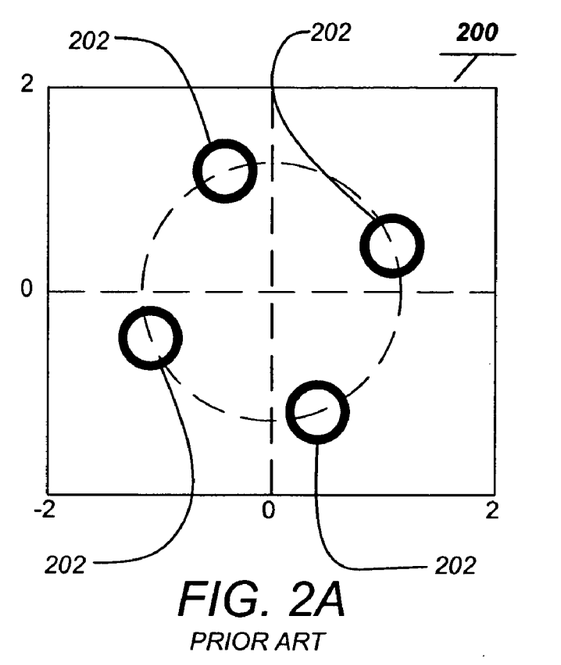
FIGS. 2A–2C illustrate a signal constellation of a second transmission layer over a first transmission layer non-coherently.
Figure 2B:
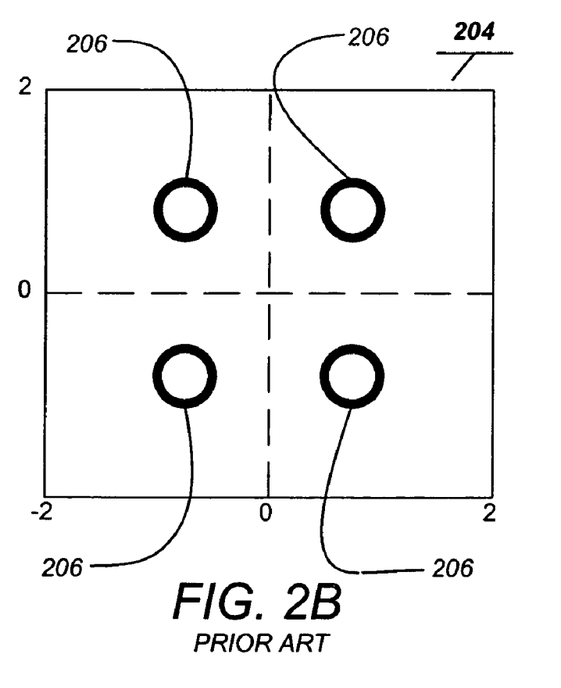
Figure 2C:
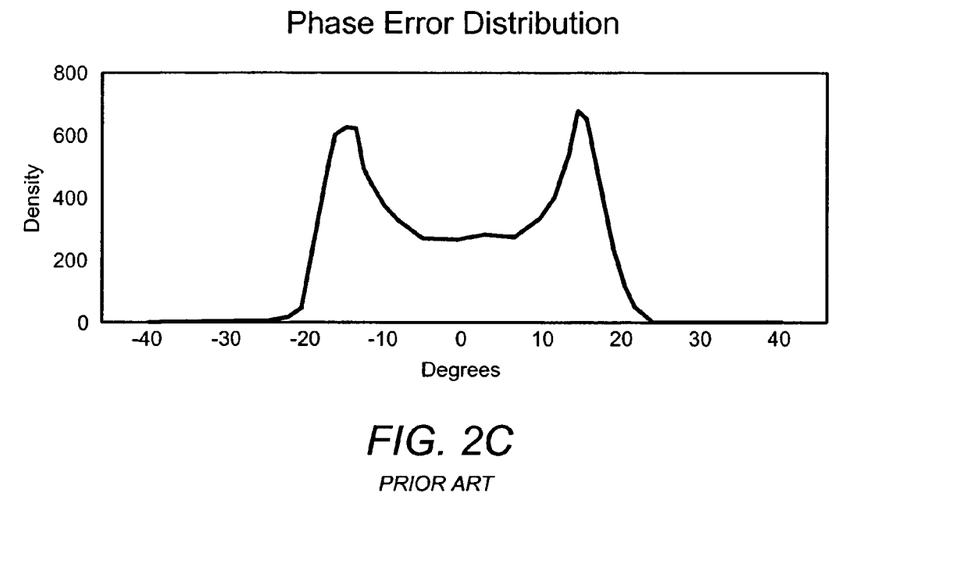

FIGS. 2A–2C illustrate a signal constellation of a lower transmission layer over the upper transmission layer after upper layer demodulation. FIG. 2A shows the constellation 200 before the upper carrier recovery loop (CRL) and FIG. 2B shows the constellation 200 after CRL. In this case, the signal points of the lower layer are rings 202. FIG. 2C depicts a phase distribution of the received signal with respect to nodes 102. As mentioned above, relative modulating frequencies cause the lower layer constellation to rotate around the nodes of the upper layer constellation. After the lower layer CRL this rotation is eliminated. The radius of the lower layer constellation is determined by its power level. The thickness of the rings 202 is determined by the carrier to noise ratio (CNR) of the lower layer.

Figure 3:
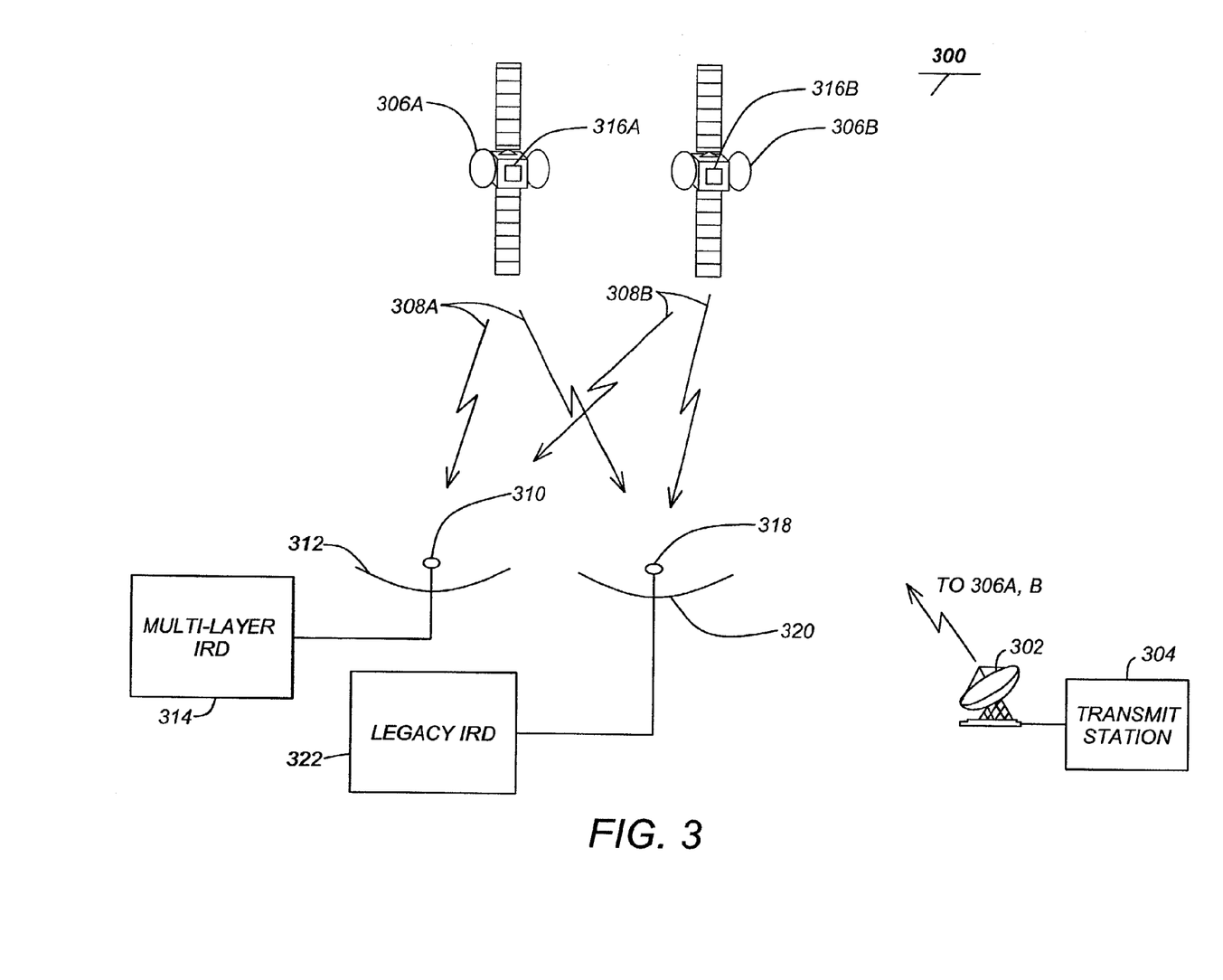
FIG. 3 is a block diagram for a typical transmission system for a receiver of the invention.

FIG. 3 is a block diagram for a typical system 300 of transmitting and receiving layered signals, with at least one of the signals being a legacy signal and the others including a non-legacy signal. Separate transmitters 316A, 316B, as may be located on any suitable platform, such as satellites 306A, 306B, are used to non-coherently transmit different layers of a signal of the present invention. They may also exist on the same platform. Uplink signals are typically transmitted to each satellite 306A, 306B from one or more transmit stations 304 via an antenna 302. The layered signals 308A, 308B (downlink signals) are received at receiver antennas 312, 320, such as satellite dishes, each with a low noise block (LNB) 310, 318 where they are then coupled to integrated receiver/decoders (IRDs) 314, 322.

One IRD 322 is legacy device which only discerns the upper layer of the layered signals 308A, 30513. It demodulates and decodes the upper layer (legacy signal) and ignotes the lower layer (non-legacy signal) as noise. The other IRD 314 is capable of demodulating and decoding both layers of the layered signals 308A, 308B, with an integrated layered modulation decoder which will be detailed hereafter. It should be noted that antennas 312, 320 can each comprise more than one directional receiving dish to receive layered signals 308A, 308B from separate satellites as will be detailed in the receiver system described hereafter.

Because the signal layers may be transmitted non-coherently, separate transmission layers may be added at any time using different satellites 306A, 306B or other suitable platforms, such as ground based or high altitude platforms. Thus, any composite signal, including new additional signal layers will be backwards compatible with legacy receivers which will disregard the new signal layers. To ensure that the signals are distinguishable, the combined signal and noise level for the lower layer must be at or below the allowed noise floor for the upper layer. Alternate receiver systems employing the invention described here can be constructed to decode signals having more than two signal layers.

3. Receiver System

Figure 4:
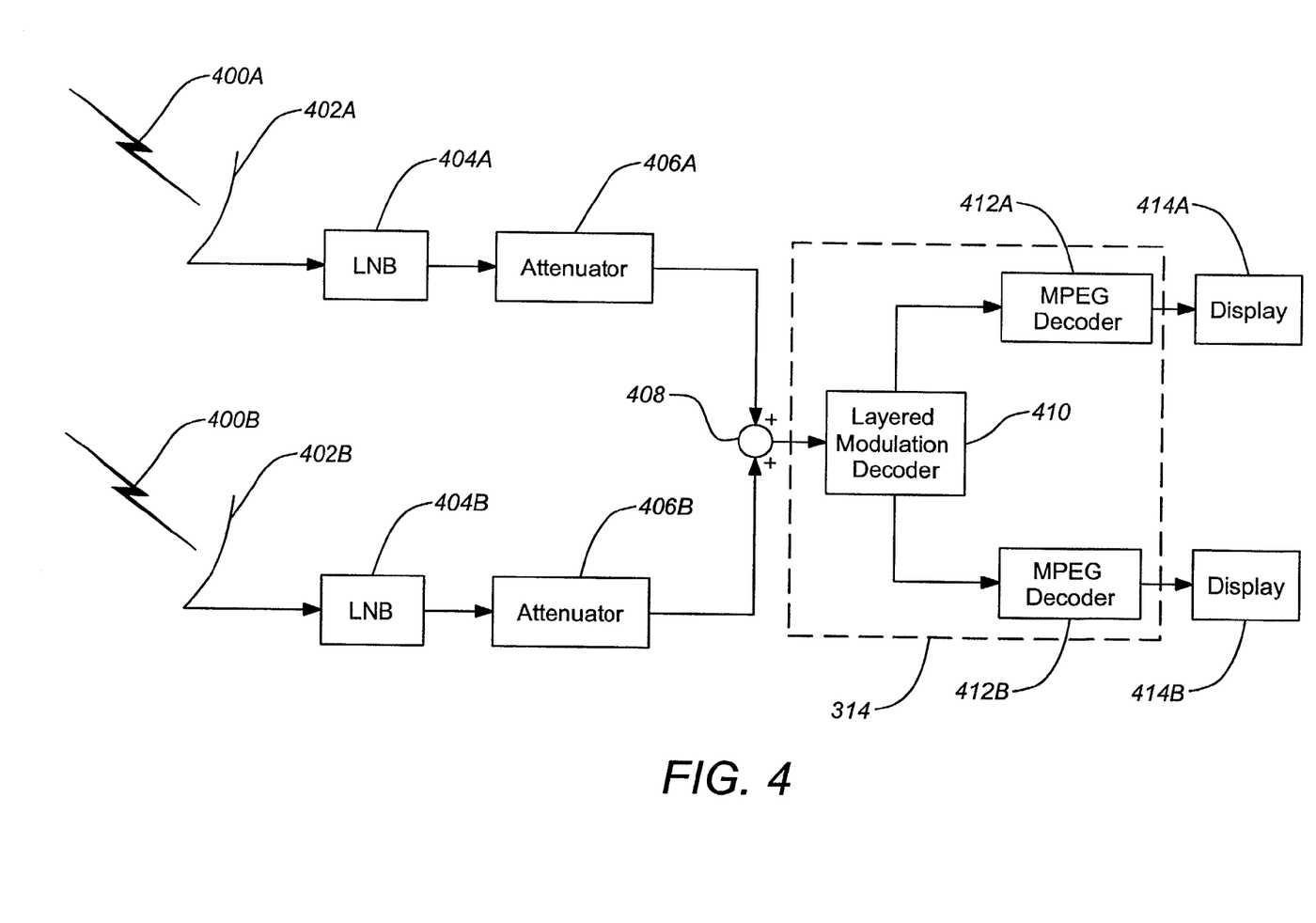
FIG. 4 is a block diagram of a receiving architecture of the invention.

FIG. 4 is a block diagram of a receiving architecture for testing the invention method. Emulated layered signals 400A, 400B are received by receiving dishes 402A, 402B (which can alternately be combined in a single dish with a single LNB). The signals 400A, 400B can each be transmitted by distinct transmitters from separate satellites, but they exist in interfering frequency bands, e.g. 12.5 GHz. The received layered signals 400A, 400B are then directed through respective low noise blocks (LNBs) 404A, 404B and attenuators 406A, 406B. The LNBs 404A, 404B convert each of the received layered signals 400A, 400B to an intermediate frequency range, e.g. 950–1450 MHz. The layered signals are combined at the summation block 408, with their relative power levels adjusted by the attenuators 406A, 406B.

It should be noted that the details regarding the reception of the layered signal up to the summation block 408 are not critical to the operation of the invention and shown only as one example. Many designs are possible. For example, as previously mentioned, the same receiver dish can be used for both layered signals 400A, 400B. Two acceptably interfering layered signals provided at the same input is all that is required for the invention to function.

The combined layered signals 400A, 400B are input to a layered modulation decoder 410 of the invention. The decoder processes the layered signals 400A, 400B to separate the layered signals 400A, 400B into two distinct signals, one for each layer. The distinct signals are each input to separate transports 412A, 412B (e.g. MPEG decoders) for further processing to produce separate video signals. The video signals are then communicated to displays 414A, 414B. Of course, alternate architectures can employ a single display 414 switched between the transports 412A, 412B. Similarly, a single transport 412 can be employed, switched between the two signal layer outputs of the layered modulation decoder 410. The layered modulation decoder 410 and video transports 412A, 412B can all be combined as part of a stand alone IRD 314 for receiving and decoding both layered signals.

4. Layered Modulation Decoder

Figure 5:
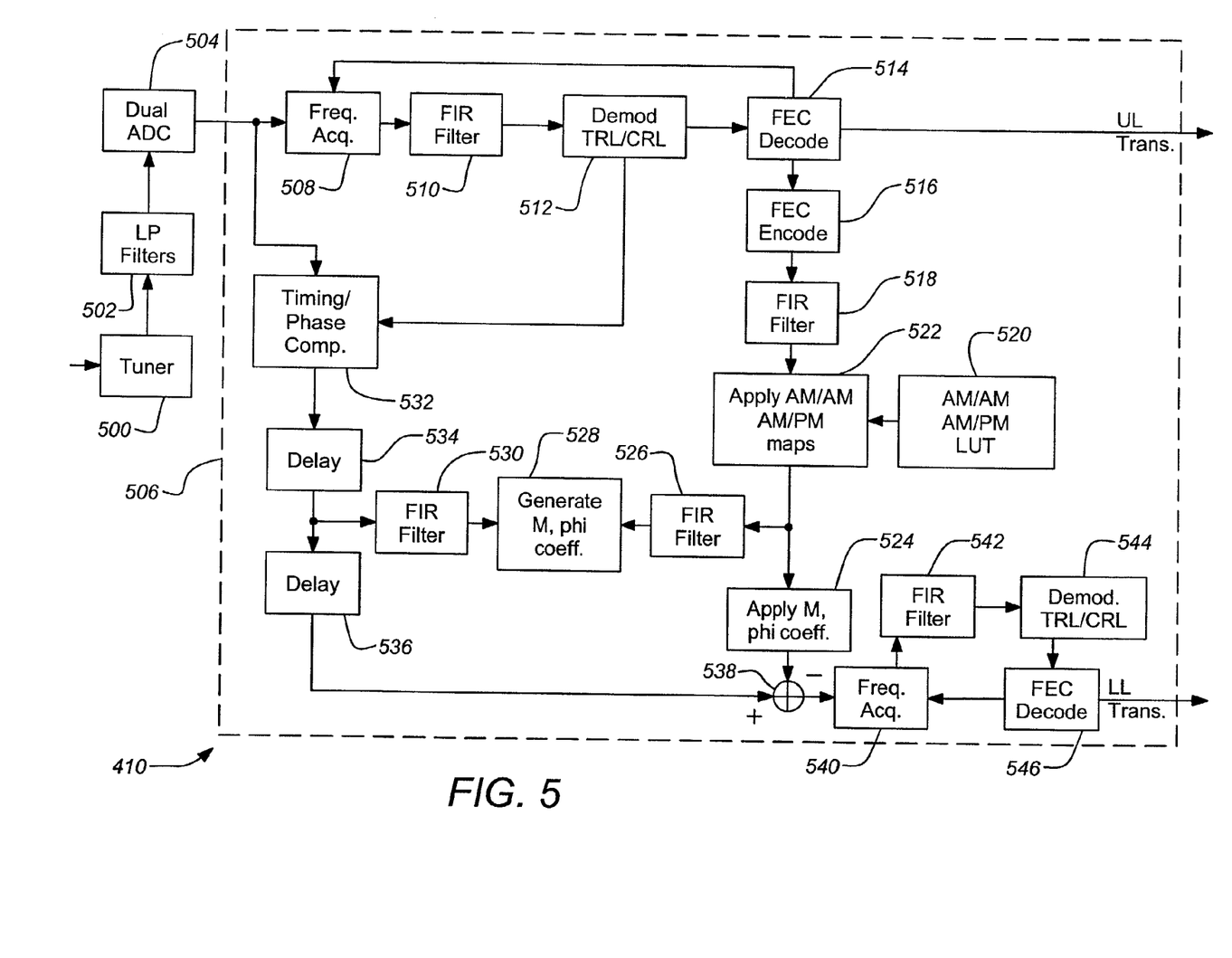
FIG. 5 is a block diagram of a layered modulation decoder of the invention.

FIG. 5 is a block diagram of a layered modulation decoder 410 of the invention. The layered modulation decoder 410 decodes both layers of an incoming layered signal to yield a separate signal for each layer, as previously discussed.

The incoming layered signal is first tuned to convert it to a baseband in-phase (I) and quadrature (O) signal by tuner 500. The separate signals can then be filtered by a low pass filter 502 in preparation for digitizing. The signals are then digitized at a high sampling rate and sufficient resolution by an analog-to-digital converter (ADC) 504. A dual channel ADC 504 or separate ADCs can be used for the separate in-phase and quadrature signals. The digitized signals are then communicated to a processor 506.

The processor 506 for extracting a lower layer signal can be implemented as a logic circuit. The entering digitized in-phase and quadrature signals can be first split into two paths. On the signal path for the upper layer, the in-phase and quadrature signals can first be passed through a frequency acquisition loop 508. They can then be filtered through a finite impulse response (FIR) matched filter 510. A demodulator 512 demodulates the signals, with carrier and timing recovery loops, and produces demodulated layered in-phase and quadrature signals. The demodulated signals are then decoded by decoder 514 which can incorporate Viterbi decoding, deinterleaving and Reed-Solomon (RS) decoding functions as appropriate to accurately determine the upper layer symbols. The decoded upper layer symbol signal can then be output from the processor 506, where it can be communicated to a transport 412A and subsequently converted to video.

Back in the processor 506, the decoded upper layer symbol signal is also applied to an encoder 516 in order to produce an ideal upper layer signal (i.e. an upper layer signal transmitted without the noise and interference of the lower layer signal). The encoded signal is again produced as in-phase and quadrature signal components. A variety of signal processing techniques can be applied to these signals to produce the ideal upper layer.

The ideal upper layer signal can be filtered through an FIR matched filter 518. Characteristics of the transmission (e.g. amplifier nonlinearities, etc.) can be accounted for by signal maps 520, such as an amplitude modulation to amplitude modulation (AM/AM) map and/or an amplitude modulation to phase modulation map (AM/PM). The signal maps 520 are applied 522 to the encoded signals to simulate downlink transmission of an upper layer signal. These signal maps 520 can be updated to account for changes in the transmission characteristics of the satellite. Similarly, a pulse shaping function 526 (one example being an FIR matched filter) can also be applied after accounting for the transmission characteristics (by applying 522 the signal maps). In addition, an upper layer amplitude and phase matching function 528, driven by the demodulated layered signal and the ideal reconstructed upper layer signals, can be used to generate matching coefficients. The matching coefficients are applied 524 to the reconstructed upper layer signal to ensure that it is appropriately scaled in magnitude and rotated in phase as compared to the layered signal, for maximum cancellation in the final signal subtraction.

Ultimately, the ideal reconstructed in-phase and quadrature signals for the upper layer are subtracted from the layered in-phase and quadrature signals that are produced by the demodulator at a subtractor 538. A timing and phase compensation function 532 is applied to the second layered path entering the processor 506, using information from the demodulator 512. A fixed delay 534 can be applied to the second layered signal path to determine the appropriate delay to align the layered and ideal signals to generate matching coefficients 528. The delayed layered signal is split and, in one path, an FIR matched filter 530 can be applied to it before generating matching coefficients 528. The second delayed layered signal path is delayed 536 again to align it appropriately with the ideal upper layer signal for subtraction 538. The results of the subtraction are the in-phase and quadrature signals of the lower layer.

The in-phase and quadrature signals of the lower layer are then translated into the proper signal format for a transport 412B to convert to video. The lower layer signal undergoes frequency acquisition 540 and a digital filter 542 (e.g. an FIR matched filter) can operate on the signals. The signals can then be demodulated at demodulator 544, to have the lower carrier removed in this case. Finally the demodulated in-phase and quadrature signals can be appropriately decoded by decoder 546 to produce a signal compatible with the video transport 412.

Figure 6:
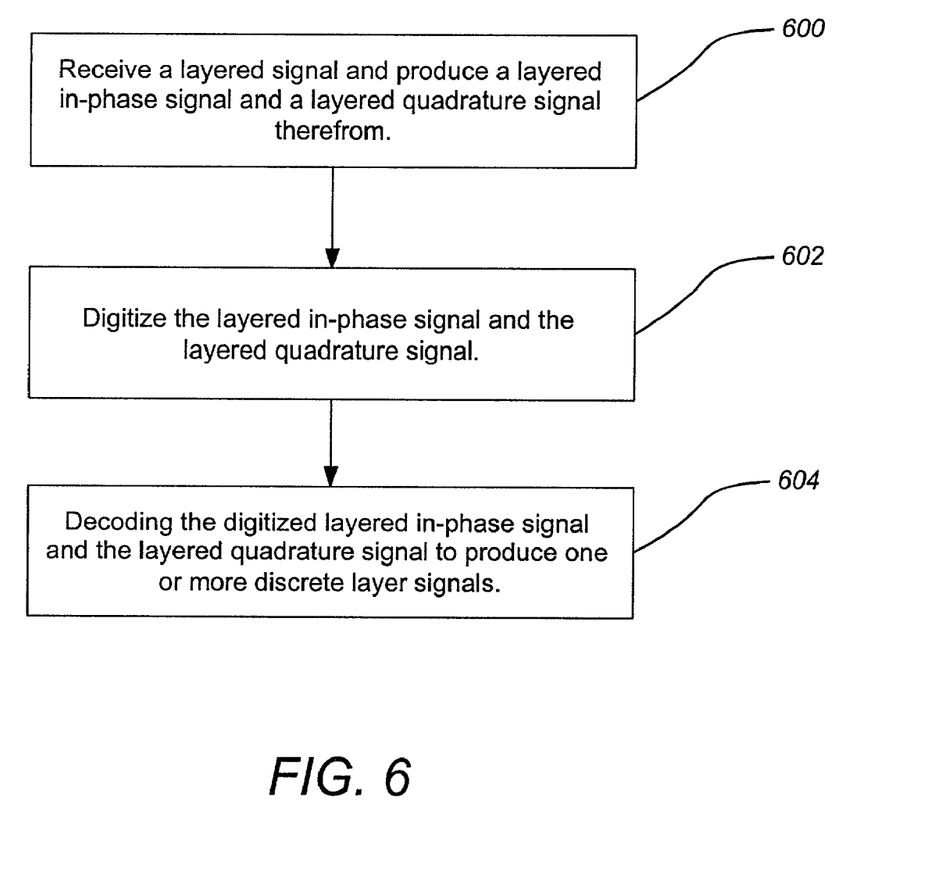
FIG. 6 describes a method of a layered modulation decoding according to the invention.

FIG. 6 describes a method of a layered modulation decoding according to the invention. At block 600, a layered signal is received and a layered in-phase signal and a layered quadrature signal are produced therefrom. At block 602, the layered in-phase signal and the layered quadrature signal are digitized. Finally, at block 604, the digitized layered in-phase signal and the layered quadrature signal are decoded to produce one or more discrete layer signals. An upper layer signal is demodulated and decoded from the layered in-phase signal and the layered quadrature signal to produce an upper one of the one or more discrete layer signals. An ideal upper layer signal including an ideal in-phase upper layer signal and an ideal quadrature upper layer signal are produced from the decoded upper layer signal and subtracted from the layered in-phase signal and the layered quadrature signal, respectively, to produce a lower layer in-phase signal and a lower layer quadrature signal of a lower one of the one or more discrete layer signals. The layered in-phase signal and the layered quadrature signal are delayed to synchronize the subtraction. Delaying the signals comprises correlating the layered in-phase signal and the layered quadrature signal are delayed by to the ideal in-phase upper layer signal and the ideal quadrature upper layer signal.

5. Conclusion

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. An apparatus for receiving a non-coherently layered modulation signal comprising a lower layer signal non-coherently layered with an upper layer signal, comprising:
    a tuner for receiving the non-coherently layered modulation signal and producing a non-coherently layered in-phase signal and a non-coherently layered quadrature signal therefrom;
    an analog-to-digital converter for digitizing the non-coherently layered in-phase signal and the non-coherently layered quadrature signal; and
    a processor for decoding the non-coherently layered in-phase signal and the non-coherently layered quadrature signal to produce the upper layer signal and the lower layer signal.

2. The apparatus of claim 1, wherein the processor comprises a logic circuit.

3. The apparatus of claim 1, further comprising a first decoder for and decoding the upper layer signal to be displayed, and a second decoder for decoding the lower layer signal.

4. The apparatus of claim 1, wherein decoding by the processor performs frequency acquisition on the non-coherently layered quadrature signal.

5. The apparatus of claim 1, wherein decoding by the processor march filters the non-coherently layered in-phase signal and the non-coherently layered quadrature signal.

6. The apparatus of claim 1, wherein the processor produces an ideal upper layer signal including an ideal in-phase upper layer signal and an ideal quadrature upper layer signal from the decoded upper layer signal and subtracts the ideal in-phase upper layer signal and the ideal quadrature upper layer signal from the layered in-phase signal and the layered quadrature signal, respectively, to produce a lower layer in-phase signal and a lower layer quadrature signal of a lower one of the one or more discrete layer signals.

7. The apparatus of claim 6, wherein the processor demodulates and decodes the lower layer in-phase signal and the lower layer quadrature signal to produce the lower layer signals.

8. The apparatus of claim 6, wherein the processor match filters the lower layer in-phase signal and the lower layer quadrature signal.

9. The apparatus of claim 6, wherein the layered in-phase signal and the layered quadrature signal are delayed to synchronize the subtraction.

10. The apparatus of claim 9, wherein delaying the layered in-phase signal and the layered quadrature signal are delayed by correlating to the ideal in-phase upper layer signal and the ideal quadrature upper layer signal.

11. The apparatus of claim 6, wherein producing the ideal upper layer signal comprises signal processing the ideal in-phase upper layer signal and the ideal quadrature upper layer signal.

12. The apparatus of claim 11, wherein signal processing the ideal in-phase upper layer signal and the ideal quadrature upper layer signal comprises finite impulse response matched filtering the ideal in-phase upper layer signal and the ideal quadrature upper layer signal.

13. The apparatus of claim 11, wherein signal processing the ideal in-phase upper layer signal and the ideal quadrature upper layer signal comprises applying a signal map to the ideal in-phase upper layer signal and the ideal quadrature upper layer signal, the signal map accounting for transmission distortions of the layered signal.

14. The apparatus of claim 11, wherein signal processing the ideal in-phase upper layer signal and the ideal quadrature upper layer signal comprises amplitude and phase matching the ideal in-phase upper layer signal and the ideal quadrature upper layer signal with the layered in-phase signal and the layered quadrature signal, respectively.

15. A processor for decoding a non-coherently layered modulation signal comprising a lower layer signal non-coherently layered with an upper layer signal into the upper layer signal and the lower layer signal, comprising:
    a first demodulator and first decoder for demodulating and decoding the upper layer signal from the non-coherently layered modulation signal and providing the demodulated and decoded upper layer signal at a first output;
    an encoder for generating an ideal upper layer signal from the decoded upper layer signal;
    a signal processor for modifying the ideal upper layer signal to characterize transmission and processing effects;
    a subtractor for subtracting the modified ideal upper layer signal from the non-coherently layered modulation signal to produce the lower layer signal; and
    a second demodulator and second decoder for demodulating and decoding the lower layer signal and providing the decoded lower layer signal at a second output.

16. The processor of claim 15, further comprising a delay function correlated to an output of the signal processor to appropriately delay the non-coherently layered modulation signal to synchronize amplitude and phase matching of the modified ideal upper layer signal and the layered signal.

17. The processor of claim 15, further comprising a delay function correlated to an output of the signal processor to appropriately delay the non-coherently layered modulation signal to synchronize subtraction of the modified ideal upper layer signal and the layered signal.

18. The processor of claim 15, wherein the signal processor performs finite impulse response matched filtering on the ideal upper layer signal.

19. The processor of claim 15, wherein the signal processor performs finite impulse response matched filtering on the delayed layered signal.

20. The processor of claim 15, wherein the signal processor applies a signal map to the ideal upper layer signal.

21. The processor of claim 15, wherein the signal processor amplitude and phase matches the ideal upper layer signal with the layered signal.

22. A method of decoding a non-coherently layered modulation signal comprising a lower layer signal non-coherently layered with an upper layer signal, comprising the steps of:
receiving the non-coherently layered modulation signal and producing a non-coherently layered in-phase signal and a non-coherently layered quadrature signal therefrom;
digitizing the non-coherently layered in-phase signal and the non-coherently layered quadrature signal; and
decoding the digitized non-coherently layered in-phase signal and the non-coherently layered quadrature signal to produce the upper layer signal and the lower layer signal.

23. The method of claim 22, wherein the step of decoding is performed by a logic circuit.

24. The method of claim 22, wherein the step of decoding includes frequency acquisition on the layered quadrature signal.

25. The method of claim 22, further comprising receiving and decoding the upper layer signal and the lower layer signal.

26. The method of claim 22, wherein the step of decoding comprises matched filter the non-coherently layered in-phase signal and the non-coherently layered quadrature signal.

27. The method of claim 22, wherein the step of decoding comprises demodulating and decoding an upper layer signal from the non-coherently layered in-phase signal and the non-coherently layered quadrature signal to produce the upper layer signal.

28. The method of claim 27, wherein the step of decoding comprises producing an ideal upper layer signal including an ideal in-phase upper layer signal and an ideal quadrature upper layer signal from the decoded upper layer signal and subtracting the ideal in-phase upper layer signal and the ideal quadrature upper layer signal from the non-coherently layered in-phase signal and the non-coherently layered quadrature signal, respectively, to produce a lower layer in-phase signal and a lower layer quadrature signal of the lower layer signals.

29. The method of claim 28, wherein the step of decoding comprises demodulating and decoding the lower layer in-phase signal and the lower layer quadrature signal to produce the lower one of the one or more discrete layer signals.

30. The method of claim 28, wherein the step of decoding comprises match filtering the lower layer in-phase signal and the lower layer quadrature signal.

31. The method of claim 28, wherein the step of decoding comprises delaying the layered in-phase signal and the layered quadrature signal to synchronize the subtraction.

32. The method of claim 31, wherein delaying comprises correlating the layered in-phase signal and the layered quadrature signal.

33. The method of claim 28, wherein producing the ideal upper layer signal comprises signal processing the ideal in-phase upper layer signal and the ideal quadrature upper layer signal.

34. The method of claim 33, wherein signal processing the ideal in-phase upper layer signal and the ideal quadrature upper layer signal comprises pulse shaping the ideal in-phase upper layer signal and the ideal quadrature upper layer signal.

35. The method of claim 33, wherein signal processing the ideal in-phase upper layer signal and the ideal quadrature upper layer signal comprises applying a signal map to the ideal in-phase upper layer signal and the ideal quadrature upper layer signal, the signal map accounting for transmission distortions of the layered signal.

36. The method of claim 33, wherein signal processing the ideal in-phase upper layer signal and the ideal quadrature upper layer signal comprises amplitude and phase matching the ideal in-phase upper layer signal and the ideal quadrature upper layer signal with the non-coherently layered in-phase signal and the non-coherently layered quadrature signal, respectively.

* * * * *